US012360500B2

(12) United States Patent
Feng et al.

(10) Patent No.: US 12,360,500 B2
(45) Date of Patent: Jul. 15, 2025

(54) ARTIFICIAL INTELLIGENCE COMPUTING DEVICE, CONTROL METHOD AND APPARATUS, ENGINEER STATION, AND INDUSTRIAL AUTOMATION SYSTEM

(71) Applicant: Siemens Aktiengesellschaft, Munich (DE)

(72) Inventors: Shang Ke Feng, Beijing (CN); Ming Jie, Beijing (CN); Bin Xu, Beijing (CN); Yun Long Xu, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 807 days.

(21) Appl. No.: 17/270,098

(22) PCT Filed: Aug. 23, 2018

(86) PCT No.: PCT/CN2018/101973
§ 371 (c)(1),
(2) Date: Feb. 22, 2021

(87) PCT Pub. No.: WO2020/037608
PCT Pub. Date: Feb. 27, 2020

(65) Prior Publication Data
US 2021/0181695 A1    Jun. 17, 2021

(51) Int. Cl.
*G05B 13/02* (2006.01)
*G06N 3/08* (2023.01)
(Continued)

(52) U.S. Cl.
CPC .......... *G05B 13/0265* (2013.01); *G06N 3/08* (2013.01); *G06N 20/00* (2019.01); *H04L 9/40* (2022.05); *H04L 45/08* (2013.01)

(58) Field of Classification Search
CPC ...... G05B 13/0265; G06N 20/00; G06N 3/08; H04L 9/40; H04L 45/08
See application file for complete search history.

(56) References Cited

U.S. PATENT DOCUMENTS

| 5,341,496 A * | 8/1994 | Middledorp ..... G05B 19/41835 |
| | | 714/E11.015 |
| 11,061,391 B2 * | 7/2021 | Kahabka ............ G05B 23/0237 |

(Continued)

FOREIGN PATENT DOCUMENTS

| CN | 1419170 A | 5/2003 |
| CN | 102508456 A | 6/2012 |

(Continued)

OTHER PUBLICATIONS

An 'open' Fieldbus comparison, The MTL Instruments Group, Printed Aug. 1997.*

(Continued)

*Primary Examiner* — Nimesh G Patel
(74) *Attorney, Agent, or Firm* — Harness, Dickey & Pierce, P.L.C.

(57) ABSTRACT

Provided is an artificial intelligence (AI) computing device applied to an industrial automation system. The AI computing device is connected to a field bus via a field bus interface and is communicated with a controller. The AI computing device processes data sent by the controller by using a built-in AI computing architecture, analyzes the data, and sends the analysis result to the controller. Also provided are a corresponding method and apparatus, an engineer station, and an industrial automation system.

23 Claims, 5 Drawing Sheets

(51) Int. Cl.
*G06N 20/00* (2019.01)
*H04L 9/40* (2022.01)
*H04L 45/02* (2022.01)

(56) References Cited

U.S. PATENT DOCUMENTS

| | | | | |
|---|---|---|---|---|
| 2004/0059851 | A1* | 3/2004 | Donaires | G05B 19/0423 710/104 |
| 2006/0047480 | A1* | 3/2006 | Lenz | G05B 23/0254 702/183 |
| 2006/0224811 | A1* | 10/2006 | Sichner | G05B 19/0428 710/306 |
| 2010/0042376 | A1 | 2/2010 | Weatherhead | |
| 2011/0246427 | A1 | 10/2011 | Andrews et al. | |
| 2013/0124465 | A1* | 5/2013 | Pingel | H04L 67/12 707/610 |
| 2014/0121785 | A1* | 5/2014 | Ismail | H04L 12/4035 700/3 |
| 2015/0127876 | A1* | 5/2015 | Erni | G06F 13/4282 710/315 |
| 2017/0357249 | A1* | 12/2017 | Sandler | G06Q 10/00 |
| 2020/0103888 | A1* | 4/2020 | Sayyarrodsari | G05B 17/02 |

FOREIGN PATENT DOCUMENTS

| | | |
|---|---|---|
| CN | 103217935 A | 7/2013 |
| CN | 105243047 A | 1/2016 |
| CN | 105324728 A | 2/2016 |
| CN | 105721546 A | 6/2016 |
| CN | 107491044 A | 12/2017 |
| DE | 19933924 A1 | 11/2000 |
| JP | 2003195913 A | 7/2003 |
| JP | 2008511938 A | 4/2008 |
| JP | 2010244158 A | 10/2010 |
| JP | 2011066881 A | 3/2011 |
| JP | 2012027621 A | 2/2012 |
| JP | 2012118715 A | 6/2012 |
| JP | 2014146087 A | 8/2014 |
| JP | 2016091043 A | 5/2016 |
| JP | 2017079006 A | 4/2017 |
| JP | 2017225001 A | 12/2017 |
| JP | 2018081619 A | 5/2018 |
| JP | 2018097839 A | 6/2018 |
| JP | 2018124813 A | 8/2018 |
| KR | 20080059196 A | 6/2008 |
| KR | 20180082606 A | 7/2018 |
| WO | WO 2005029314 A1 | 3/2005 |
| WO | WO 2017168706 A1 | 10/2017 |

OTHER PUBLICATIONS

International Search Report PCT/ISA/210 and Written Opinion of the International Searching Authority PCT/ISA/237 for International Application No. PCT/CN2018/101973 dated Aug. 23, 2018.

* cited by examiner

ARTIFICIAL INTELLIGENCE COMPUTING DEVICE, CONTROL METHOD AND APPARATUS, ENGINEER STATION, AND INDUSTRIAL AUTOMATION SYSTEM

PRIORITY STATEMENT

This application is the national phase under 35 U.S.C. § 371 of PCT International Application No. PCT/CN2018/101973 which has an International filing date of Aug. 23, 2018, which designated the United States of America, the entire contents of each of which are hereby incorporated herein by reference.

FIELD

Embodiments of the invention generally relate to the field of industrial automation, and in particular to an artificial intelligence (AI) computing device, a control method and apparatus, an engineer station (ES), and an industrial automation system.

BACKGROUND

After a long period of continuous development of the autonomous technology of industrial production, it is now possible to use computer technology to control industrial production processes. An industrial automatic control system gathers, analyzes, and organizes various parameters in industrial production collected by sensors through industrial control computers for information management and automatic control. At present, the implementation of intelligent control in industrial automation systems has become a trend in the field of industrial automation. In order to realize intelligence in the control chain, the challenge is that traditional industrial controllers cannot provide sufficient computing capacity and there is no flexible solution to add AI to the control system.

SUMMARY

The embodiments of this application propose an AI computing device, a control method and apparatus, an engineer station, and an industrial automation system. At least one embodiment is used to implement closed-loop control with AI in an industrial automation system and to improve the control capability and the control efficiency of the automation system.

The AI computing device of at least one embodiment of the present application, applied to an industrial automation system, may comprise: a backplane, a communication component, and a computing component.

In at least one embodiment, the backplane comprises a backplane bus and a field bus interface, wherein the backplane bus is connected to the communication component and the computing component, and the field bus interface can be connected to and communicate with a field bus of an industrial automation system through the field bus interface; the industrial automation system comprises at least one controller;

the communication component performs data interchange between the controller and the computing component; and the computing component receives data sent by the controller through the communication component, analyzes the data by use of an embedded AI computing architecture, and sends the analysis result to the controller by use of the communication component.

It can be seen that the AI computing device of at least one embodiment has a field bus interface, which can be directly connected to the field bus of an industrial automation system to provide plug-and-play intelligent control functions and enhances the processing capacity of the control system. At the same time, the AI computing device is directly connected to the field bus, which facilitates real-time intelligent closed-loop control and improves the control efficiency of the system.

The control method of at least one embodiment of the present application, applied to a controller in an industrial automation system, may comprise:

obtaining data in the industrial automation system;
sending the data to an artificial intelligence (AI) computing device connected to a field bus; and
receiving, through the field bus, an analysis result obtained by analyzing the data by the AI computing device, and providing the analysis result to a decision-making apparatus in the controller, so that the decision-making apparatus generates a control instruction for automation control.

It can be seen that the control method of each embodiment analyzes data by use of the AI computing device connected to the field bus, and uses the analysis result to generate automatic control instructions, so as to improve the processing capacity of the controller and realize real-time intelligent closed-loop control without replacing existing equipment or limitation by the processing capacity of existing equipment.

The control apparatus of at least one embodiment of the present application, applied to a controller in an industrial automation system, may comprise:

a production data obtaining unit, configured to obtain data in the industrial automation system;
a task sending unit, configured to send the data to a first computing component in an artificial intelligence (AI) computing device connected to a field bus; and
a result collecting unit, configured to receive, by use of the field bus, an analysis result sent by the AI computing device, wherein the analysis result is obtained by analyzing the data by the first computing component; and to provide the analysis result to a decision-making apparatus in the controller, so that the decision-making apparatus generates a control instruction for automation control.

It can be seen that the control apparatus of at least one embodiment analyzes data by use of the AI computing device connected to the field bus, and uses the analysis result to generate automatic control instructions, so as to improve the processing capacity of the controller and realize real-time intelligent closed-loop control without replacing existing equipment or limitation by the processing capacity of existing equipment.

The engineer station of at least one embodiment of the present application, connected to a field bus of an industrial automation system, may comprise a processor and a memory, wherein the memory comprises machine readable instructions, and the instructions are executable by the processor for:

providing a device configuration interface;
receiving device configuration information from the device configuration interface, wherein the device configuration information comprises an identifier of an AI computing device and a computing component identifier of at least one computing component in the AI computing device, and the AI computing device is connected to the field bus by use of a field bus interface; and sending the device configuration information to a controller of the industrial automation system, so that the controller communicates with the AI computing device by use of the device configuration information; and obtaining a control logic corresponding to the AI computing device, receiving, from the device configuration interface, control configuration information for the AI computing device, wherein the control configuration information comprises a computing parameter of a first computing component in the at least one computing component; loading the control configuration information into the control logic, and loading the control logic into the controller, wherein the control logic is used for enabling the controller to configure the first computing component; sending data in the industrial automation network to the first computing component for analysis, and obtaining an analysis result fed back by the first computing component.

It can be seen that the engineer station of each embodiment can configure the controller through the field bus, so as to realize the communication between the controller and the AI computing device for real-time intelligent closed-loop control in the industrial automation system.

The industrial automation system of at least one embodiment of the present application may comprise: an engineer station (ES), a controller, production equipment and an AI computing device, and a field bus connecting the devices;

the ES is configured to:
provide a device configuration interface, receive configuration information from the device configuration interface, wherein the configuration information comprises information about the AI computing device, and load the configuration information into the controller; and
obtain a control logic corresponding to the AI computing device, and load the control logic into the controller;

the controller is configured to:
execute the control logic, obtain values of a plurality of production parameters in the industrial automation system, and send the values of the plurality of production parameters to the AI computing device; and receive an analysis result sent by the AI computing device; and
generate a control instruction for the production equipment based on the analysis result; and the AI computing device is configured to:
receive, by use of the field bus, the values of the plurality of production parameters sent by the controller, analyze the values of the plurality of production parameters to obtain an analysis result, and send the analysis result to the controller by use of the field bus.

It can be seen that the industrial automation system of each embodiment improves the control capability of the system by use of the AI computing device connected to the field bus, and at the same time, it can also realize real-time intelligent closed-loop control.

The embodiments of the present application also provide a computer readable storage medium, storing machine readable instructions, wherein the machine readable instructions can enable a processor to perform the control method of the embodiments.

BRIEF DESCRIPTION OF THE DRAWINGS

The preferred embodiments of the present application will be described in detail below with reference to the drawings, so that those skilled in the art will better understand the above and other features and advantages of the present application. In the drawings.

In the drawings, the following symbols are used:

| No. | Meaning |
|---|---|
| 10 | Industrial automation system |
| 20 | AI computing device |
| 21 | Backplane |
| 211 | Backplane bus |
| 212 | Field bus interface |
| 22 | Communication component |
| 221 | Periodic data |
| 222 | Aperiodic data |
| 223 | Diagnostic service data |
| 23 | Computing component |
| 231 | AI computing architecture |
| 232 | Configuration data storage module |
| 233 | Training data storage module |
| 235 | Status switching module |
| 26 | Record data |
| 27 | IO channel |
| 271 | First transmission channel |
| 272 | Second transmission channel |
| 30 | Engineer station |
| 31 | Control logic |
| 32 | Processor |
| 33 | Memory |
| 34 | Communication device |
| 35 | Operating system |
| 36 | Network communication module |
| 37 | Management module |
| 371 | Interface module |
| 372 | Device configuration module |
| 373 | Control configuration module |
| 40 | Controller |
| 41 | Control apparatus |
| 411 | Production data obtaining unit |
| 412 | Task sending unit |
| 413 | Result collecting unit |
| 414 | Configuration unit |
| 415 | Training unit |
| 42 | Decision-making apparatus |
| 60 | Field bus |
| S1 | Initialization complete |
| S2 | Preparing for training |
| S3 | Training |
| S4 | Training error |
| S5 | Preparing for operation |
| S6 | Operating |
| S7 | Operation error |
| S61-S63 | Steps |
| K1, K2, K3, | Parameters |

| No. | Meaning |
| --- | --- |
| V, T, Q1 and Q2 | |

DETAILED DESCRIPTION OF THE EXAMPLE EMBODIMENTS

The following example embodiments will further illustrate the present application in detail in order to clarify its purpose, technical solution and advantages.

Figure 1:
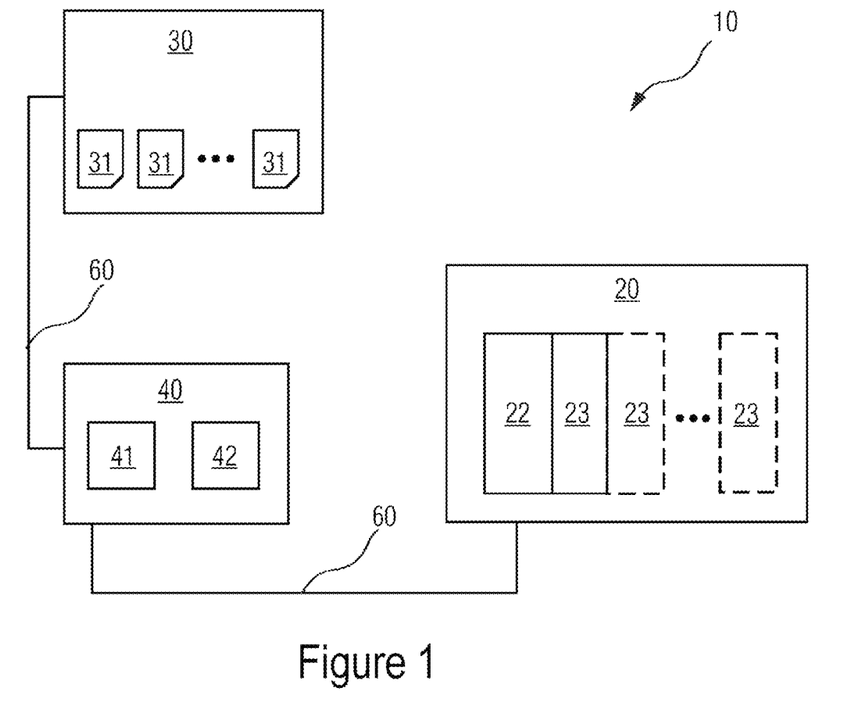
FIG. 1 illustrates the industrial automation system of an embodiment of the present application.

In order to overcome the limitation of the controller's computing capacity on the control mechanism of industrial automation systems, the embodiments of the present application propose to add an AI computing device with the artificial intelligence computing capability to the control loop of industrial automation systems, thereby enhancing the system's autonomous control capability and realizing intelligence in the control chain. FIG. 1 illustrates the industrial automation system of the embodiments of the present application. The industrial automation system 10 is an industrial production system that uses automatic control and automatic regulating devices to replace manually operated machines and machine systems for manufacturing and production. As shown in FIG. 1, the system 10 may comprise: an AI computing device 20, an engineer station (ES) 30, a controller 40, and a field bus 60 connecting these devices.

The field bus 60, also known as the industrial data bus, is used to implement digital communication among field devices such as the controller 40, data acquisition equipment (not shown), and actuators (not shown) at an industrial production site, and information transfer between these field devices and advanced control systems (such as ES 30). The field bus 60 may be implemented with a certain field bus technology, such as ProfiBus, InterBus, Controller Area Network (CAN) bus, and Addressable Remote Transducer (HART) bus.

The controller 40 may be one or more industrial controllers, such as programmable logic (PLC) controllers, PC bus industrial computer (IPC) controllers, distributed control system (DCS) controllers, field bus control system (FCS) controllers, computer numerical control (CNC) controllers, etc. The controller 40 can communicate with various data acquisition equipment (such as intelligent instruments, sensors, etc.) and actuators (such as current regulating valves, voltage regulating valves, feed valves, etc.) on the production site, and monitor and control the production processes of production equipment. Production equipment (not shown) refers to a collection of one or more equipment used for industrial processing and manufacturing, such as machine tools, lathes, assembly line equipment, etc. When the production equipment is a program-controlled equipment with a field bus interface, the controller 40 can also communicate with the production equipment through the field bus 60, collect process information of the production equipment, and monitor and control the production process of the production equipment.

The controller 40 can obtain various parameter values of the production equipment (hereinafter also referred to as production parameter values and production process data), and control the operation of the production equipment according to these production parameter values. The production parameters may be any parameters related to the production process of the production equipment, such as voltage, current, motor speed, feeding speed of raw materials, etc. The values of production parameters may be obtained from data acquisition equipment or from program-controlled production equipment. The controller 40 can also regulate the values of production parameters by sending control instructions to actuators. An actuator can receive the control signal of the controller 40 and perform corresponding regulation actions to change the value of a production parameter.

The AI computing device 20 is a plug-and-play device with the AI computing capability, which can be connected to a field bus through a field bus interface. The AI computing device 20 can receive, by use of the field bus 60, the values of a plurality of production parameters sent by the control apparatus 41 in the controller 40, analyze the values of the plurality of production parameters to obtain an analysis result, and send the analysis result to the controller 40 by use of the field bus 60, so that the decision-making apparatus 42 in the controller 40 can generate control instructions for automatic control based on the analysis result. In some embodiments, the system 10 can be connected to a plurality of AI computing devices 20. The plurality of AI computing devices may include devices with different AI functions, or may include several identical devices to provide redundant backup or load sharing.

In order to enable the controller 40 to identify and use the AI computing device 20, the controller 40 may be configured for the AI computing device 20 at the ES 30.

The ES 30 refers to the industrial process monitoring and management equipment used by industrial process control engineers. It can configure the controller 40 in the industrial control system so that the controller 40 can communicate with other equipment on the production site, perform data processing, and make control decisions to monitor and control the production process.

The ES 30 may provide a device configuration interface, receive configuration information about the AI computing device from the device configuration interface, and load the configuration information into the controller 40. The controller 40 uses the configuration information to communicate with the AI computing device 20.

In some embodiments, the device configuration interface of ES 30 may comprise a human-machine interaction interface. ES 30 can display the configuration and operation of each device in the system 10 through the human-machine interaction interface, and display the configuration interface through the human-machine interaction interface. In response to the operator's operation on the configuration interface in the human-machine interaction interface, the ES 30 can complete various device configuration operations, such as device addition, deletion, adding device configuration information, modifying device configuration information, deleting device configuration information, etc. The configuration information received from the device configuration interface may comprise the text information (such as the ID and address of the AI computing device, etc.) entered by the operator in the ES 30, configuration files obtained from a path entered or selected by the operator through the device configuration interface, control logic, etc. A path entered or selected by the operator may be a storage path in the built-in storage device of the ES 30, a path in an external extended storage device of the ES 30, or a location on the network (such as a URL, etc.). In some embodiments, the configuration information may comprise the ID of the AI computing device 20 (e.g., a media access control (MAC) address, device name, etc.), so that the controller 40 can communicate with the AI computing device 20. In some embodiments, the configuration information may also comprise information about a plurality of production parameters required by the AI computing device 20 to perform the AI computing process, so that the controller 40 can provide the AI computing device 20 with the values of these production parameters collected by sensors.

In some embodiments, the ES 30 may also obtain the control logic 31 corresponding to the AI computing device 20, and load the control logic 31 to the controller 40. For example, the ES 30 can obtain the control logic 31 from a path entered or selected by the operator through the device configuration interface. A path entered or selected by the operator may be a storage path in the built-in storage device of the ES 30, a path in an external extended storage device of the ES 30, or a location on the network (such as a URL, etc.). The ES 30 can also configure and edit the functions of the control logic 31 through the interface provided by the control logic 31. The controller 40 controls the AI computing device 20 by executing the control logic 31. The above-mentioned information about the plurality of production parameters may also be loaded into the control logic 31 through the interface provided by the control logic 31. The controller 40 obtains the values of these production parameters by executing the control logic 31 and provides them to the AI computing device 20. In some embodiments, the AI computing device 20 may comprise a communication component 22 and one or more computing components 23. The AI computing device 20 may comprise a plurality of computing components 23 with different AI functions, or a plurality of computing components with the same function. The computing components 23 with different AI functions can correspond to different control logics 31, and the computing components 23 with different AI functions can be controlled by the same control logic 31.

The industrial automation system of each embodiment has the plug-and-play intelligent control function and better processing capacity of the control system without the need to replace existing devices or limitation by the processing capacity of existing devices by use of an AI computing device with a field bus interface. At the same time, the AI computing device is directly connected to the field bus, and production process data are analyzed and processes directly on site, which facilitates real-time intelligent closed-loop control and improves the control efficiency.

Figure 2:
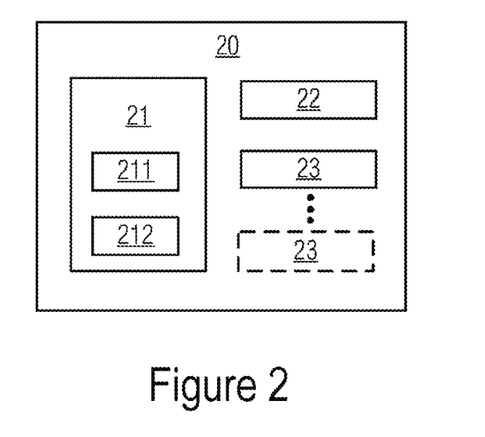
FIG. 2 illustrates the AI computing device of an embodiment of the present application.

In order to realize plug and play, the AI computing device 20 comprises a physical interface that can be connected to a field bus, and supports industrial communication protocols used by industrial automation systems for communication. The following takes the implementation of an AI computing device 20 as an example for illustration. FIG. 2 illustrates the AI computing device of the embodiments of the present application. As shown in FIG. 2, the AI computing device 20 may comprise: a backplane 21, a communication component 22, and a computing component 23.

The backplane 21 comprises a backplane bus 211 and a field bus interface 212. The backplane bus 211 is used to connect the communication component 22 and the computing component 23. The field bus interface 212 can be connected to and communicate with a field bus 60 through the field bus interface. The field bus interface 212 is an interface that conforms to the field bus technology used by the field bus 60, such as ProfiBus, InterBus, CAN, HART, etc. The backplane bus 211 may use any bus technology, such as a bus technology designed required, or an existing data transmission bus. For example, the backplane bus interface provided by the backplane bus 211 may be a low-voltage differential signaling interface, an S422 interface, an RS485 interface, etc.

The communication component 22 performs data interchange between the controller 40 and the computing component 23.

The computing component 23 comprises an AI computing architecture. In some embodiments, the AI computing architecture may comprise an AI computing logic, such as machine learning logic, and neural network algorithm. In some embodiments, the AI computing architecture may also comprise special hardware with high computing performance customized for AI computing (such as GPU, FPGA, ASIC, neural network processor, etc.). The computing component 23 can receive data sent by the controller 40 through the communication component 22, analyze the data by use of an embedded AI computing architecture, and send the analysis result to the controller 40 by use of the communication component 22.

The AI computing device 20 of each embodiment has a field bus interface, and thus can provide plug-and-play intelligent control functions in industrial automation systems and enhance the processing capacity of the control system. At the same time, the AI computing device analyzes and processes production process data on the production site, which facilitates real-time intelligent closed-loop control and improves the control efficiency.

In some embodiments, in order to realize the communication between the AI computing device 20 and the controller, the communication component 22 may communicate with the field bus 60 by use of a packet format defined by an industrial communication protocol (such as PROFINET, EtherCat, etc.). The communication component 22 can use the packet format defined by the industrial communication protocol to parse a packet sent by the controller 40, and send the content of the packet obtained from the parsing to the computing component 23. The communication component 22 can also use the packet format to encapsulate the feedback data sent by the computing component 23, and send the encapsulated packet to the controller 40. Through the communication with the controller 40 by use of existing industrial communication protocol packets, it is easy to implement the AI computing device 20 directly in an existing industrial communication network without modifying the network. In some embodiments, the communication component may be implemented as FPGA, ASIC, integrated circuits, industrial communication chips, etc.

The AI computing device 20 may comprise one or more computing components 23. When a computing component 23 is provided in the AI computing device 20, the communication component 22 can forward data between the computing component and the controller 40. When the AI computing device 20 comprises a plurality of computing components 23, the communication component 22 can use the computing component identifier of each computing component 23 to realize the communication between each computing component 23 and the controller 40. In some embodiments, the communication component may receive a packet conforming to the industrial communication protocol sent by the controller 40 through the field bus interface 212 (in order to distinguish it from the packet sent by the AI computing device 20, it will be referred to as the first packet hereinafter). Specifically, the first packet comprises a header and a payload. The payload comprises one or more identifiers of the computing components 23 (hereinafter referred to as computing component identifiers) and the packet data or content corresponding to each computing component identifier. The computing component identifier of the computing component 23 is used to distinguish each computing component 23 in the AI computing device 20. It may be a name, a serial number, etc., a device identification code configured in the computing component 23 during production, or another identifier assigned by the controller 40. The communication component 22 can parse the identifier of the computing component 23 and the packet data corresponding to the identifier from the first packet according to the packet format defined by the industrial communication protocol, and send the packet data to the computing component 23 corresponding to the identifier through the backplane bus 211. The communication component 22 can also receive feedback data from the first computing component 23 (the first computing component 23 is one computing component of a plurality of computing components 23) through the backplane bus 211, combine the feedback data with the computing component identifier of the first computing component 23 as the packet data to generate a packet in the packet format defined by the industrial communication protocol (in order to distinguish it from the packet sent by the controller 40, it is referred to as the second packet hereinafter), and send the second packet to the controller 40 through the field bus interface 212. Specifically, the feedback data is the result of processing the message data by the computing component 23, which is used to enable the controller 40 to obtain the status of the computing component 23, analysis results, etc., so as to generate control decisions for the AI computing device 20 or other equipment (such as production equipment, actuators, etc.). For example, when the packet data is configuration information, the feedback data may be a confirmation packet that the configuration is complete; when the packet data is a training instruction, the feedback data may be the result of the training; when the packet data is production process data, the feedback data may be the analysis result of the production process data. In this way, by adding the identifier of the computing component 23 in communication, the controller 40 can communicate with multiple computing components 23 in the AI computing device 20. A single AI computing device 20 may comprise s plurality of computing components 23, which greatly improves the computing capacity and computing capability of a single AI computing device 20.

In some embodiments, the data interchanged between the computing component 23 and the controller 40 may be divided into a plurality of types. For example, the data may be divided into a plurality of types depending on the priority, transmission time requirement, etc. The communication component can process the data according to a preset processing strategy corresponding to the type of the received data. Preset processing strategies may comprise the strategy for the data processing sequence, the strategy for the data transmission sequence, the strategy for the data transmission method, etc. In some embodiments, different types of logical transmission channels may be preset for different types of data. The communication component 22 can determine the type of data according to the data channel identifier corresponding to the data in the first packet sent by the controller 40, and process the data according to the processing strategy corresponding to the type; obtain the data type provided by the first computing component 23 through the backplane bus 211, and send the second packet corresponding to the feedback data to the controller 40 through the field bus interface 212 by use of the transmission channel preset to be corresponding with the type of the feedback data.

Figure 3:
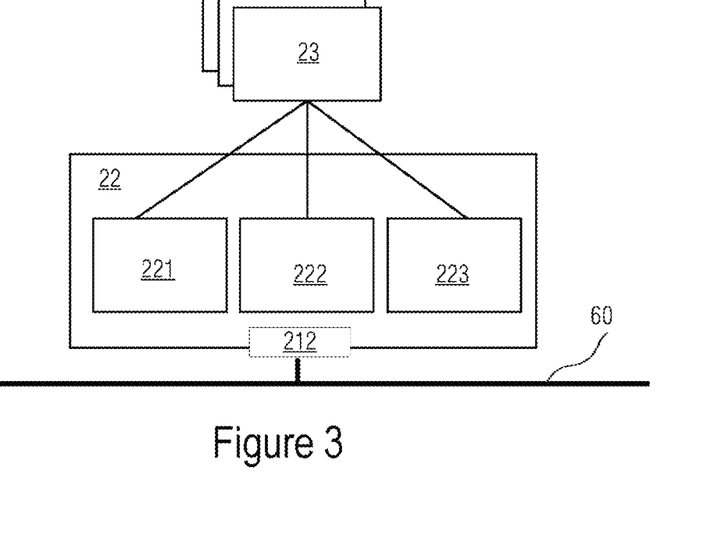
FIG. 3 illustrates the logic of internal data communication of the AI computing device of an embodiment of the present application.

FIG. 3 illustrates the internal data communication between the computing component 23 and the communication component 22 of the AI computing device 20 of the embodiments of the present application. As shown in FIG. 3, one or more computing components 23 in the AI computing device 20 can send feedback data and its type to the communication component 22. The communication component 22 maps the feedback data to different data channels according to the type of the feedback data, and transmits it to the field bus 60 through the field bus interface 212. In this example, the types of the feedback data may comprise periodic data 221, aperiodic data 222, diagnostic service data 223, etc.

Figure 4:
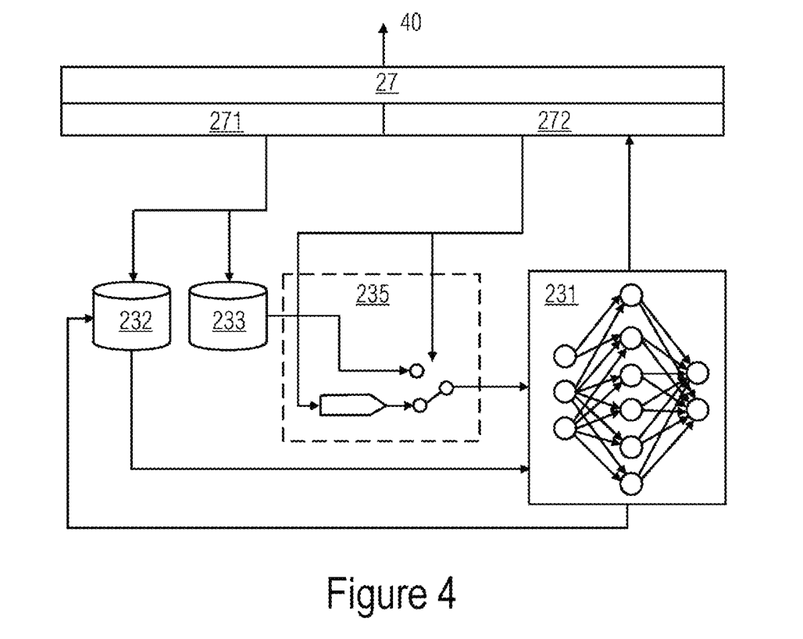
FIG. 4 illustrates the logic of internal data processing of the AI computing device of an embodiment of the present application.

FIG. 4 illustrates the data communication between the computing component 23 of the AI computing device 20 and the controller 40 through different logical channels in the embodiments of the present application. As shown in FIG. 4, the logical channels between the AI computing device 20 and the controller 40 (hereinafter also referred to as the IC channel 27) are classified as a first transmission channel 271 and a second transmission channel 272. The first transmission channel 271 is an aperiodic transmission channel, i.e., its transmission timing is not periodic and it transmits data only when needed. The second transmission channel 272 is a periodic transmission channel that transmits data at a fixed time interval. The first transmission channel 271 and the second transmission channel 272 can be distinguished by their channel identifiers.

In FIG. 4, the computing component 23 can interchange record data with the controller 40 through the first transmission channel 271. Record data may be data of low importance or low requirement for real-time communication, such as configuration information (such as configuration information of the structure of the AI computing architecture, configuration information of the input parameters and output parameters of the AI computing architecture 231, etc.), training data, etc. The computing component 23 can store configuration information in the built-in configuration data storage module 232, and store training data in the training data storage module 233. In some cases, the computing component can send the configuration information in the built-in configuration data storage module 232 to the controller 40 through the first transmission channel 271, and the controller can adjust the computing architecture of other modules according to the configuration information.

In FIG. 4, the computing component 23 can also interchange control data with the controller 40 through the second transmission channel 272. For example, the control data may comprise a state switching instruction for the AI computing architecture 231 sent by the controller 40, production process data to be analyzed sent by the controller 40, a status report of the AI computing architecture 231 sent by the computing component 23, etc.

The computing component 23 may comprise a status switching module 235 for changing the operating status of the AI computing architecture 231 according to the status switching instruction sent by the controller 40. For example, the status switching module 235 may use the second transmission channel 272 to send the current operating status of the AI computing architecture 231 to the controller 40 through the communication component 22, receive a status switching instruction sent by the controller 40 through the communication component 22, and switch the AI computing architecture 231 from a first operating status to a second operating status. For example, the status switching module 235 may send the status of the AI computing architecture 231 to the controller 40 through the second transmission channel 272 by use of the initial status word (ISW), and switch the status of the AI computing architecture 231 according to the operation control word (OCW) sent by the controller 40.

The state switching module 235 may also input data corresponding to the current operating status provided by the controller (40) into the AI computing architecture (231) according to the current operating status of the AI computing architecture (231). For example, when the AI computing architecture 231 is in the training status, the status switching module 235 may input the training data sent by the controller 40 through the first transmission channel 271 and stored in the training data storage module 233 into the AI computing architecture 231 for training the AI computing architecture 231. For example, when the AI computing architecture 231 is in the operating status, the status switching module 235 may input the data to be analyzed periodically sent by the controller 40 through the second transmission channel 272 into the AI computing architecture 231 so that the AI computing architecture 231 may output the analysis result. The analysis result generated by the AI computing architecture 231 may also be fed back to the controller 40 through the second transmission channel 272.

In this way, by use of different transmission channels to transmit different types of data, the data response capability and processing efficiency of the AI computing device 20 are improved.

One or more AI computing devices 20 may be provided in the system 10, and each AI computing device 20 may comprise one or more computing components 23, and different computing components 23 may have AI computing architectures 231 with different functions. The functions that the AI computing architecture 231 can implement may include, but are not limited to, online parameter optimization, process monitoring, fault diagnosis, etc.

For example, when the AI computing architecture 231 comprises an optimization computation process for online optimization, the AI computing architecture 231 can perform a preset optimization computation process to optimize a plurality of production parameters in the production process data, and output the recommended values of a plurality of production parameters. In some examples, the computing module 23 may also convert the recommended values into production adjustment recommendation identifiable by the controller 40 as analysis result. Production adjustment recommendation comprises the recommended value of at least one of the plurality of production parameters. In some examples, the processing strategy for the recommended values can be preset. For example, a threshold can be preset, and when the difference between the recommended value and the actual value of a parameter is no greater than the threshold, the adjustment recommendation for the parameter can be excluded from the analysis result. This avoids frequent and unnecessary changes to production parameters.

For another example, when the AI computing architecture 231 comprises a parameter measuring process for status monitoring, the AI computing architecture 231 can perform a preset parameter measuring process to measure a plurality of production parameters in the production process data, and output the result of the parameter measurement, which indicates whether the plurality of production parameters are normal. In some examples, the computing module 23 may also convert the parameter measurement result into a status monitoring report identifiable by the controller 40 as analysis result, and the status monitoring report comprises information for indicating whether the status of the production equipment is normal.

For yet another example, when the AI computing architecture 231 comprises a fault diagnosis process, the AI computing architecture 231 can perform a preset fault diagnosis process, whereby the values of a plurality of production parameters in the production process data are used to perform fault diagnosis and the fault diagnosis result is output. The fault diagnosis result comprises information about a component (e.g., collector, actuator, production equipment, etc.) in the system 10. In some examples, the computing module 23 may also convert the fault diagnosis result into a fault report identifiable by the controller 40 as analysis result, and the fault report comprises information about components.

By adopting the AI computing architecture 231 with different functions, the control capability of industrial automation systems can be improved.

In some embodiments, the computing component 23 may also comprise a configuration unit (not shown) for configuring the AI computing architecture 231. The configuration unit may receive the configuration parameters sent by the controller 40 through the communication component 22, wherein the configuration parameters comprise a plurality attribute values of the AI computing architecture 231; and set the values of a plurality of attributes corresponding to the AI computing architecture 231 as a plurality attribute values in the configuration parameters. For example, the plurality of attribute values may comprise structural attribute values, and the configuration unit may use the structural attribute values in the configuration parameters to set the components and connection methods of the AI computing architecture 231, such as the hierarchical structure of the neural network in the AI computing architecture 231. Different AI functions and different production processes have different computing requirements. The ES 30 can configure the structure information of the required AI computing architecture to the controller 40, and the controller 40 configures the corresponding computing components 23. For another example, the plurality of attribute values may comprise a first parameter and a second parameter, and the first parameter is one or more production parameters of the production equipment. The configuration unit may set the first parameter as an input parameter of the AI computing architecture 231; and set the second parameter as an output parameter of the AI computing architecture 231. Different production processes have different production parameters. The ES 30 can configure the information of the production parameters to be used to the controller 40, and the controller configures the corresponding computing components 23. The configuration unit can also save the configuration parameters in the configuration data storage module 232. An open configuration interface of the computing component 23 expands the application scope of the AI computing device 20, and the problem of excessively high costs in the development of special AI computing devices 20 for different scenarios can be solved.

Figure 5:
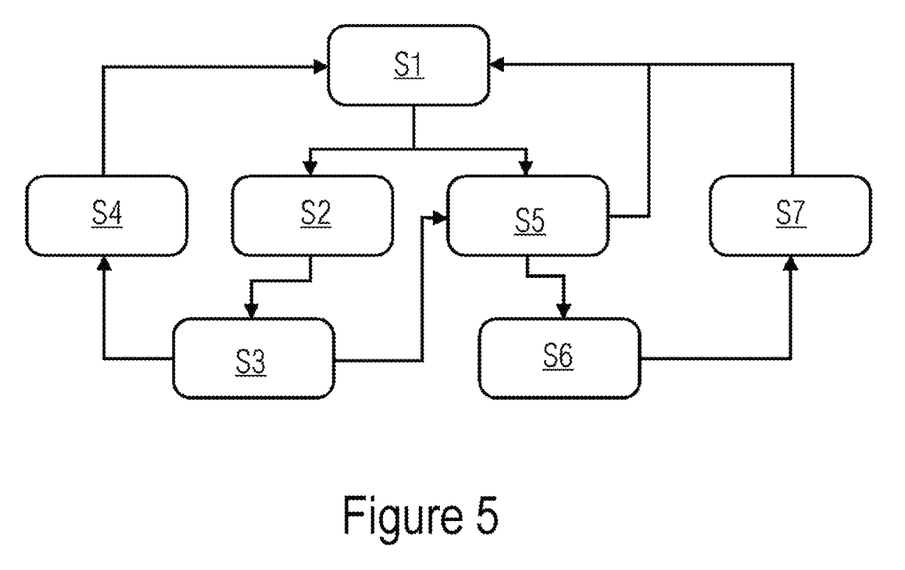
FIG. 5 illustrates a state machine of the AI computing architecture of an embodiment of the present application.

In some embodiments, the status switching module 235 can also use the state machine mechanism to manage the operating status of the AI computing architecture 231. FIG. 5 illustrates a state machine of the AI computing architecture of the embodiments of the present application. As shown in FIG. 5, the AI computing architecture 231 may have 7 statuses, namely initialization complete (S1), preparing for training (S2), training (S3), training error (S4), preparing for operation (S5), operating (S6), and operation error (S7). Operation refers to the process whereby the AI computing architecture 231 uses a trained model to analyze production process data. Accordingly, the controller 40 can use six control words to control the status transition of the AI computing architecture 231. The six control words are implemented by six signals. For example, 6-bit information may be used to represent the six types of control words, with each bit representing one instruction. For example, bit 1 means preparing for training (transition from S1 to S2), bit 2 means initiating operation (transition from S1 to S5), bit 3 means starting training (transition from S2 to S3), bit 4 means starting operation (transition from S5 to S6), bit 5 means ending training (transition from S2/S3 to S1), bit 6 means ending operation (transition from S6/S5 to S1). Setting the bit corresponding to an instruction indicates that the AI computing architecture 231 is required to perform the status transition operation corresponding to the instruction. When the AI computing architecture 231 enters the error status of S4 or S7, it can directly enter S1 after reporting the status S4 or S7 to the controller 40 without waiting for an instruction from the controller 40. With a state machine to perform status management of the AI computing architecture 231, the operation control of the AI computing architecture 231 is more standardized and management is easier.

The controller 40 can also use the state machine of the computing component 23 to synchronize the parallel tasks of a plurality of computing components 23. For example, the controller 40 allocates computing tasks to a plurality of computing components 23, and each computing component 23 will set the status bit to S1 after completing the computation. Then the controller 40 only needs to wait for all the computing components 23 to return to S1 before determining that the computing components 23 are currently synchronized and ready for next cycle of operation.

In some embodiments, the computing component 23 may also comprise an energy saving unit (not shown) for changing the working mode of the computing component 23 according to an instruction of the controller 40. The energy saving unit may receive a first instruction sent by the controller 40 through the communication component 22, and enter the low power consumption mode according to the first instruction; receive a second instruction sent by the controller 40 through the communication component 22, and exit the low power consumption mode according to the second instruction. For example, when the PROFINET protocol is used, the controller 40 will send all devices a PROFIenergy instruction for them to sleep or wake up when the automation system enters or exits the low power consumption mode. The computing component 23 can enter or exit the low power consumption mode according to the PROFIenergy instruction sent by the controller 40. This can reduce the energy consumption of the AI computing device 20 when the automation system is operating in the low power consumption mode.

In some embodiments, the backplane 21 may comprise a plurality of slots, and the computing component 23 is connected to the backplane bus 211 through the slots as a pluggable expansion card. In this way, when the computing capacity of the AI computing device 20 needs to be expanded, a new computing component 23 can be connected through the slots. When a computing component 23 needs to be replaced (for example, an existing computing component 23 for parameter optimization needs to be replaced with a computing component 23 for fault diagnosis), the existing computing component 23 may be removed from the slot, and a new computing component 23 may be inserted. This pluggable design can easily expand the computing capability of the AI computing device 20 or change the AI functions of the AI computing device 20.

Figure 6:
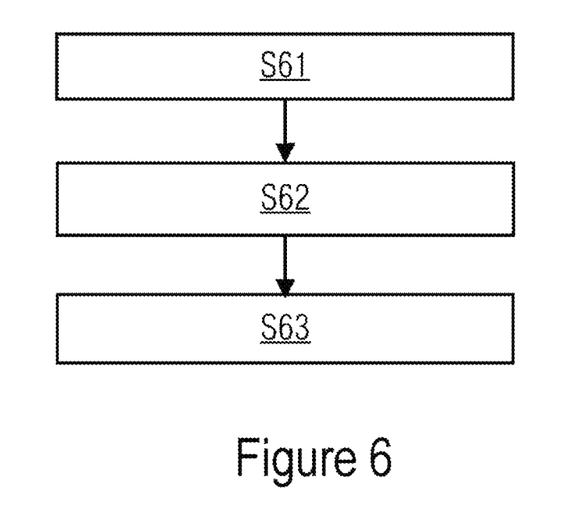
FIG. 6 illustrates a control method of an embodiment of the present application.

The following describes how the controller 40 controls the AI computing device 20. FIG. 6 is a flow chart of a control method of the embodiments of the present application. The method can be implemented by the control apparatus 41 in the controller 40. The method may comprise the following steps.

Step S61, obtaining data in the industrial automation system.

Step S62, sending the data through the field bus 60 of the industrial automation system to the AI computing device connected to the field bus 60.

Step S63, receiving, through the field bus 60, an analysis result obtained by analyzing the data by the AI computing device 20, and providing the analysis result to a decision-making apparatus 42 in the controller 40, so that the decision-making apparatus generates a control instruction for the production equipment.

In the control method of each embodiment, by use of an AI computing device with a field bus interface to analyze production process data, it is possible to implement intelligent closed-loop control in an industrial automation system and improve control efficiency.

In some embodiments, in order to determine the production parameters that need to be provided to the AI computing device 20, the control apparatus 41 may set a plurality of input parameters in the preset first configuration information as a plurality of production parameters, and obtain the values of the plurality of production parameters from the data provided by the data acquisition equipment in the industrial automation system, which will be used as production process data. In some embodiments, the control apparatus 41 may obtain the values of a plurality of production parameters from the data provided by the data acquisition equipment in the previous time period as the production process data at an interval of a preset length of time. By periodically sending the production process data to the AI computing device 20 for analysis, the analysis result of the current production process can be obtained in a relatively timely manner, which facilitates timely adjustment of production parameters and improves production efficiency.

In some embodiments, when sending the production process data to the AI computing device 20, the control apparatus 41 may obtain the information of a first computing component 23 in the AI computing device 20 from the information of a preset second configuration; send the production process data to the first computing component 23 in the first AI computing device 20. By obtaining the information of the computing component 23 from the configuration information, it is convenient and flexible to adaptively adjust the control apparatus 41 simply through updating the configuration information when the computing component 23 is replaced or another component is added.

When the AI computing device 20 comprises a plurality of computing components 23, the control apparatus 41 needs to obtain the information of these computing components for the communication with each computing component. In some embodiments, the control apparatus 41 may obtain the information of a second configuration, in which information of a plurality of computing components is recorded. In some embodiments, the control apparatus 41 may obtain the information of a second configuration, in which information of a plurality of computing components is recorded.

In order to achieve load balancing, the control apparatus 41 may obtain load information of a plurality of computing components 23 from at least one AI computing device 20; select one computing component 23 from the plurality of computing components 23 as the first computing component 23 according to the load information, and set the AI computing device 20 to which the computing component 23 belongs as the AI computing device 20. For example, the computing component 23 may upload its load information (such as computing load, processor temperature, computing bandwidth (number of operations completed per second), etc.) to the controller 40 through identification and maintenance (I&M) information. The controller 40 can allocate a computation task to the computing component 23 according to a load balancing algorithm (for example, the packing algorithm, etc.), and send the production process data corresponding to the computation task. With a plurality of computing components 23 for load sharing, it is possible to ensure smooth operation of the control system and improve operation efficiency even when the number of computation tasks is high. The method for allocating computation tasks depends on the AI algorithm used. For example, a plurality of computing components 23 can process different parameters, or process data in different time periods, or the same data set in parallel, etc.

In some embodiments, the control apparatus 41 may use periodic data to input normalized production process data to the computing component 23 at a fixed cycle, and obtain normalized output data output from the computing component 23. Different structures of the computing components 23 may generate different amounts of input data and output data. The packet length (such as 16 bytes, 64 bytes, etc.) used by each computing component 23 may be specified in the configuration information of the control apparatus 41. The configuration information can be provided to the control apparatus 41 by the ES 30 through, for example, configuration files, device description files, etc. For example, the configuration file can be a GSDML file, which can comprise information about the manufacturer, communication ports, modules and sub-modules, alarm diagnosis, etc. Through configuration of the packet length supported by each computing component 23, the data communication between the control apparatus 41 and each computing component 23 can be implemented efficiently and flexibly.

In some embodiments, different computing components may have the AI computing architectures 231 with different functions, and the output data of the AI computing architectures 231 with different functions are also different, so are the analysis results provided to the decision-making apparatus.

For example, when the AI computing architecture 231 comprises an optimization computation process for online optimization, the AI computing architecture 231 optimizes a plurality of production parameters. The control apparatus 41 can obtain the recommended values of a plurality of production parameters output from the AI computing architecture 231, and convert the recommended values into production adjustment recommendations that can be identified by the decision apparatus 42 as analysis result provided to the decision-making apparatus 42. The production adjustment recommendations comprise the recommended value of at least one of the plurality of production parameters.

For another example, when the AI computing architecture 231 comprises a parameter measuring process for status monitoring, the AI computing architecture 231 measures the values of a plurality of production parameters. The control apparatus 41 can obtain the parameter measurement result output from the AI computing architecture 231, wherein the parameter measurement result indicates whether the values of the plurality of production parameters are normal; and convert the parameter measurement result into a status monitoring report that can be identified by the decision-making apparatus 42 as a report provided to the decision-making apparatus 42 as the analysis result, wherein the status monitoring report comprises information used to indicate whether the status of the production equipment is normal.

For yet another example, when the AI computing architecture 231 comprises a fault diagnosis process, the AI computing architecture 231 uses the values of a plurality of production parameters to perform fault diagnosis. The control apparatus 41 can obtain the fault diagnosis result output from the AI computing architecture 231, wherein the fault diagnosis result comprises information about one component of the production equipment; and convert the fault diagnosis result into a fault diagnosis report that can be identified by the decision-making apparatus 42 as a report provided to the decision-making apparatus 42 as the analysis result, wherein the fault diagnosis report comprises information about the component.

The conversion of AI computation results to analysis results in the control apparatus 41 can simplify the implementation of the computing component 23. Moreover, since the control process of the control apparatus 41 can be adjusted through configuration and programming, the adjustment is relatively easy when the control apparatus 41 processes the output data from the AI computing architecture.

In some embodiments, when the parameters of the computing component need to be configured, the control apparatus 41 may obtain the configuration parameters of a first computing component 23 from preset third configuration information, wherein the configuration parameters comprise a plurality of attribute values of the AI computing architecture used by the first computing component 23; send the configuration parameters to the first computing component 23, so that the first computing component 23 sets the values of a plurality of attribute values of the AI computing architecture to the plurality of attribute values. The plurality of attribute values of the AI computing architecture may comprise structural attribute values, or input and output parameters, etc.

In some embodiments, the training data of the AI computing architecture can also be obtained from the configuration information. For example, the control apparatus 41 may obtain training data from preset fourth configuration information, and send the training data to the first computing component 23, so that the first computing component 23 can use the training data to train the AI computing architecture in the first computing component 23.

Figure 7:
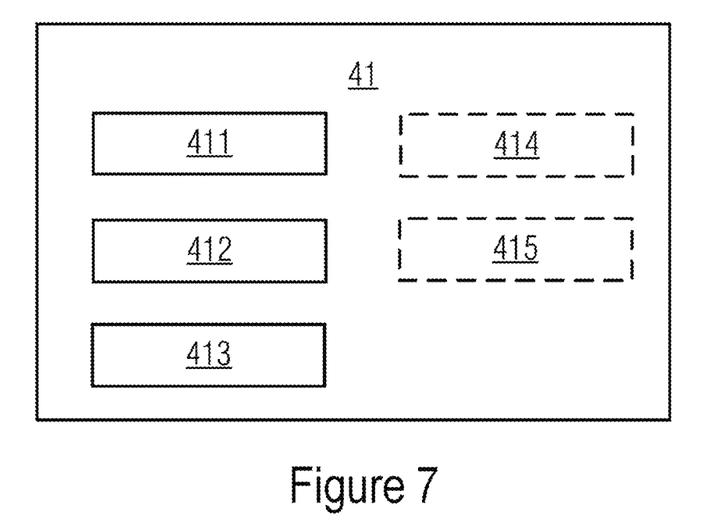
FIG. 7 illustrates a control apparatus of an embodiment of the present application.

The control method of each embodiment can be implemented by the control apparatus 41 provided in the controller 40. FIG. 7 illustrates a control apparatus of the embodiments of the present application. As shown in FIG. 7, the control apparatus 41 may comprise: a production data acquiring unit 411, a task sending unit 412, and a result collecting unit 413.

The production data acquiring unit 411 can acquire the production process data of the production equipment in the industrial automation system. The production process data comprises the values of a plurality of production parameters of the production equipment.

The task sending unit 412 can send the production process data to the first computing component 23 in the AI computing device connected to the field bus 60 through the field bus 60 of the industrial automation system.

The result collecting unit 413 can receive the analysis result sent by the AI computing device 20 through the field bus 60, wherein the analysis result is obtained from analysis of the production process of the production equipment by the first computing component 23 using the production process data; and provide the analysis result to the decision-making apparatus in the controller 40 so that the decision-making apparatus generates control instructions for the production equipment.

In some embodiments, the control apparatus may further comprise a configuration unit 414. The configuration unit 414 obtains the configuration parameters of the first computing component 23 from the preset third configuration information, wherein the configuration parameters comprise a plurality of attribute values of the AI computing architecture of the first computing component 23; and sends the configuration parameters to the first computing component 23, so as to set a plurality of attribute values of the AI computing architecture to the plurality of attribute values.

In some embodiments, the control apparatus may further comprise a training unit 415. The training unit 415 may obtain training data from preset fourth configuration information, and send the training data to the first computing component 23, so that the first computing component 23 can use the training data to train the AI computing architecture.

The control method of the embodiment of the present application may also be implemented as software code. The software code may be stored in a computer readable storage medium. The software code may be machine-readable instructions that comply with the standards for industrial control programming languages (such as IEC 61131-3). In some embodiments, the software code may be read by the ES 30 from a remote storage device, a local storage device, or a removable storage device (such as a compact disc, flash memory, etc.), and then loaded to the controller 40 after configuration. The controller 40 will execute the code to implement the above control method.

Figure 8:
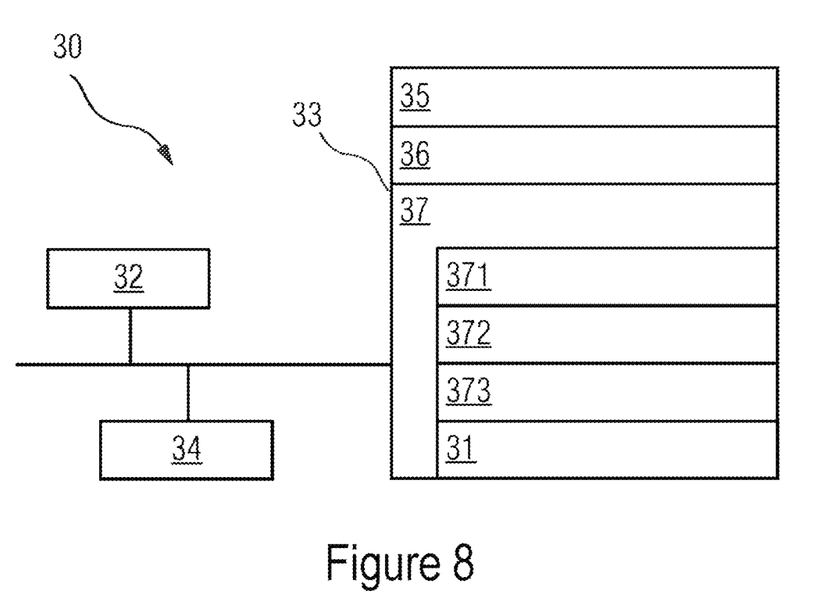
FIG. 8 illustrates an engineer station of an embodiment of the present application.

In each embodiment, the ES 30 can provide the configuration information and control logic required to control the AI computing device 20 to the controller 40, so as to enable the controller 40 to control the AI computing device 20. FIG. 8 illustrates an ES of the embodiments of the present application. As shown in FIG. 5, the ES 30 may comprise: a processor 32, a memory 33, and a communication device 34. The communication device 34 is used to enable the ES 30 to communicate with other devices on the network. The memory 33 may comprise a management module 37.

The management module 37 comprises an interface module 371, a device configuration module 372, and a control configuration module 373.

The interface module 371 can provide device configuration interfaces.

The device configuration module 372 may receive device configuration information from a device configuration interface, wherein the device configuration information comprises the identifier of the AI computing device and the identifier information of at least one computing component 23 in the AI computing device 20; send the device configuration information to the controller 40 of the industrial automation system, so that the controller 40 uses the device configuration information to communicate with the AI computing device 20.

The control configuration module 373 may obtain the control logic 31 corresponding to the AI computing device 20, and receive control configuration information for the AI computing device 20 from a device configuration interface, wherein the control configuration information comprises the computation parameters of the first computing component 23 of the at least one computing component 23; load the control configuration information into the control logic 31, and load the control logic 31 into the controller 40. The control logic can enable the controller 40 to configure the first computing component 23, send the production process data of the production equipment in the industrial automation network to the first computing component 23 for analysis, and obtain the analysis result fed back from the first computing component 23.

The interface module 371, the device configuration module 372, and the control configuration module 373 can be implemented by machine-readable instructions.

In some embodiments, the memory 33 may also comprise an operating system 35 and a network communication component 36.

In some embodiments, the device configuration module 372 may receive the channel information of the first computing component 23 from a device configuration interface, wherein the channel information comprises the identifier of one or more channels; send the channel information to the controller 40 so that the controller 40 can send the data to the first computing component 23 based on channel corresponding to the data type.

In some embodiments, the control configuration module 373 may receive architecture information of the first computing component 23 from a device configuration interface, wherein the architecture information comprises the components and connection methods of the AI computing architecture in the first computing component 23, and load the architecture information as control configuration information to the control logic; receive the input parameters and output parameters of the AI computing architecture of the first computing component 23 from a device configuration interface, and load the input parameters and output parameters as control configuration information into the control logic; receive the training data of the first computing component 23 from a device configuration interface, and load the training data as control configuration information into the control logic.

Figure 9:
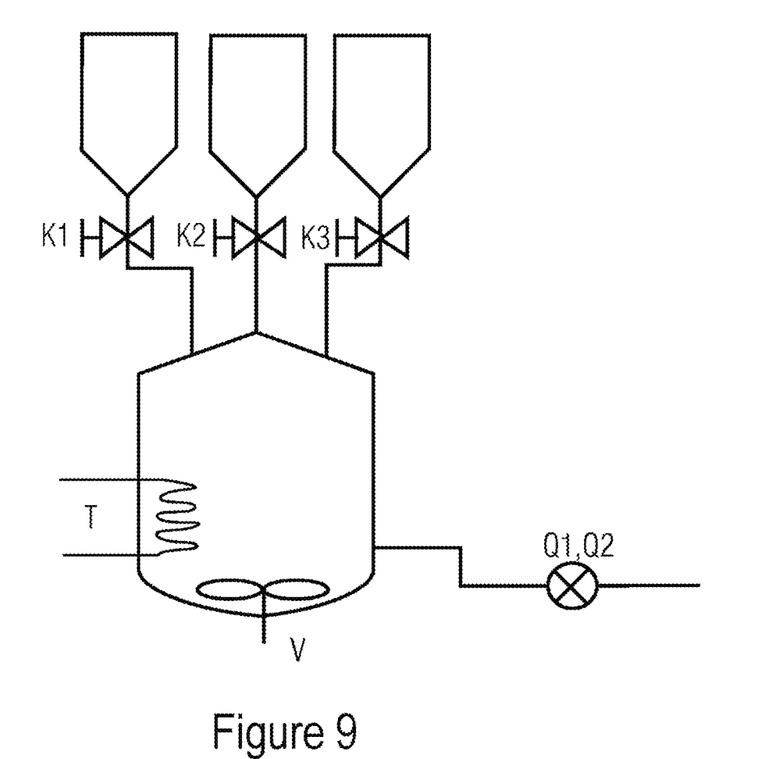
FIG. 9 illustrates a production process of an embodiment of the present application.

The following is an example of the control of an industrial production process to facilitate understanding of the control mechanism of industrial automation systems in each embodiment. This is a simple example, while other embodiments may involve more equipment and production parameters. FIG. 9 illustrates a production process of the embodiments of the present application. As shown in FIG. 9, the controller 40 controls the flow of raw materials through three servo valves K1, K2, and K3, controls the stirring speed through the motor speed V, and controls the temperature T through the set point of a thermostat. The output parameters of the production process are quality Q1 and output Q2 which can be measured by sensors.

In some embodiments, the controller 40 may send multiple sets of sample values of the production parameters K1, K2, K3, V, T, Q1, and Q2 to the computing component 23 with the parameter optimization function, and configure K1, K2, K3, V, and T as the input parameters of the AI computing architecture and Q1 and Q2 as the output parameters of the AI computing architecture. The computing component 23 can train the AI computing architecture through a neural network to obtain the neural network model corresponding to the production process. After the training, the controller 40 sends the actually collected values of the production parameters K1, K2, K3, V, T, Q1, and Q2 to the computing component 23. Based on the model obtained through training, the AI computing architecture of the computing component 23 can obtain a set of recommended values for the production parameters K1, K2, K3, V, and T, whereby the quality Q1 and output Q2 can be optimized.

In some embodiments, the controller 40 may send multiple sets of sample values of the production parameters K1, K2, K3, V, T, Q1, and Q2 to the computing component 23 with the parameter measuring function, and configure K1, K2, K3, V, and T as the input parameters of the AI computing architecture and Q1 and Q2 as the output parameters of the AI computing architecture. The computing component 23 can train the AI computing architecture through a neural network to obtain the neural network model corresponding to the production process. After the training, the controller 40 sends the actually collected values of the production parameters K1, K2, K3, V, T, Q1, and Q2 to the computing component 23. Based on the model obtained from the training, the AI computing architecture of the computing component 23 can obtain the estimated values of Q1 and Q2 corresponding to the actual values of K1, K2, K3, V, and T. When the actual values of Q1 and Q2 do not match the estimated values, a test result indicating abnormal parameter values will be output.

In some embodiments, the controller 40 may also send the values of the production parameters K1, K2, K3, V, T, Q1, and Q2 collected during a fault to the computing component 23 with the fault diagnosis function. The AI computing architecture obtained by the computing component 23 through training can obtain the probability of failure of each actuator. If the probability of K2 failure is the greatest, it can output a fault diagnosis result indicating failure of the K2 servo valve.

It can be seen that, with the plug-and-play AI computing device 20 of the embodiments of the present application, closed-loop control with artificial intelligence can be conveniently implemented in existing industrial automation control systems, thereby improving production efficiency.

The above are only the preferred embodiments of the present application, and are not intended to limit the present application. Any modification, equivalent replacement and improvement made without departing from the motivation and principle of the present application shall be included in its scope.

The invention claimed is:

1. An artificial intelligence (AI) computing device, applicable to an industrial automation system, comprising:
a backplane;
a communication component; and
a computing component, the backplane including a backplane bus and a field bus interface, the backplane bus being connected to the communication component and the computing component, the field bus interface being connectable to and communicable with an industrial field bus of the industrial automation system through the field bus interface, the industrial automation system including at least one controller;
the communication component being configured to perform data interchange with the controller via the industrial field bus; and
the computing component being configured to receive data sent by the controller through the communication component, analyze the data using an embedded AI computing architecture, and send an analysis result to the controller via the communication component, wherein the communication component is configured to use a packet format defined by an industrial communication protocol to parse a packet sent by the controller, and is configured to send content of the packet obtained from parsing to the computing component,
wherein the communication component is configured to use the packet format to encapsulate feedback data sent by the computing component, and is configured to send the encapsulated packet to the controller, and
wherein the AI computing device includes a plurality of computing components, each computing component, of the plurality of computing components, is configured to:
receive feedback data from a first computing component via the backplane bus, the first computing component being one computing component of the plurality of computing components; and
generate a second packet in the packet format using the feedback data and a first computing component identifier of the first computing component as packet data, and send the second packet to the controller via the field bus interface.

2. The AI computing device of claim 1, wherein each computing component, of the plurality of computing components, corresponds to one computing component identifier, the communication component is configured to:
receive, via the field bus interface, a first packet sent by the controller;
parse out a computing component identifier and the packet data corresponding to the computing component identifier from the first packet based on a packet format of the first packet; and
send, via the backplane bus, the packet data to the computing component corresponding to the computing component identifier.

3. The AI computing device of claim 1, wherein the communication component is configured to:
obtain, via the backplane bus, a type of the feedback data provided by the first computing component; and
send, via a transmission channel having a correspondence to the type of the feedback data, the second packet to the controller via the field bus interface.

4. The AI computing device of claim 1, wherein the computing component further comprises a status switching module, the status switching module being configured to:
input, based on a current operation status of the computing component, data corresponding to the current operation status, provided by the controller into the AI computing architecture.

5. The AI computing device of claim 4, wherein the status switching module is configured to:
send a current operation status of the AI computing architecture to the controller via the communication component; and
receive, via the communication component, a status switching instruction sent by the controller, and switch the AI computing architecture from a first operation status to a second operation status.

6. The AI computing device of claim 4, wherein the status switching module is configured to:
input training data provided by the controller into the AI computing architecture when the current operation status of the AI computing architecture is a training status, for training the AI computing architecture.

7. The AI computing device of claim 4, wherein the status switching module is configured to:
input values of a plurality of production parameters in the data into the AI computing architecture when the current operation status of the AI computing architecture is an operating status, and execute a computing process in the AI computing architecture.

8. The AI computing device of claim 1, wherein the AI computing architecture is configured to:

execute an optimization computing process to optimize values of a plurality of production parameters in the data, and output recommended values of the plurality of production parameters.

9. The AI computing device of claim 1, wherein the AI computing architecture is configured to:

execute a parameter measuring process to measure the values of a plurality of production parameters in the data, and output a parameter measurement result, the parameter measurement result indicating whether the values of the plurality of production parameters are normal.

10. The AI computing device of claim 1, wherein the AI computing architecture is configured to:

execute a fault diagnosis process, perform fault diagnosis using values of a plurality of production parameters in the data, and output a fault diagnosis result, the fault diagnosis result including information about a component in the industrial automation system.

11. The AI computing device of claim 1, wherein the computing component further comprises:

a configuration unit, the configuration unit being configured to:

receive, via the communication component, a configuration parameter sent by the controller, the configuration parameter including a structure attribute value of the AI computing architecture; and configure a structure attribute of a component of the AI computing architecture using the structure attribute value in the configuration parameter.

12. The AI computing device of claim 11, wherein the configuration unit is configured to:

receive, via the communication component, the configuration parameter sent by the controller, the configuration parameter including a first parameter and a second parameter, and the first parameter being one or more production parameters of production equipment;

configure an input parameter of the AI computing architecture as the first parameter; and configure an output parameter of the AI computing architecture as the second parameter.

13. The AI computing device of claim 1, wherein the backplane further includes a slot, the computing component, used as a pluggable expansion card, being connected to the backplane bus through the slot.

14. The AI computing device of claim 1, wherein the computing component further comprises an energy saving unit, and the energy saving unit being configured to:

receive, via the communication component, a first instruction sent by the controller, and enter a low power consumption mode according to the first instruction; and receive, via the communication component, a second instruction sent by the controller, and exit the low power consumption mode according to the second instruction.

15. A control method, applicable to a controller in an industrial automation system, and comprising:

obtaining data from production equipment in the industrial automation system;

sending the data from the controller to a computing component of an Artificial Intelligence (AI) computing device directly connected to an industrial field bus via the controller connected to the industrial field bus;

receiving at the controller, via the industrial field bus, an analysis result obtained by analyzing the data by the AI computing device using embedded AI architecture; and providing the analysis result to a decision-making apparatus in the controller, to generate a control instruction for automation control of the production equipment, wherein the communication component is configured to use a packet format defined by an industrial communication protocol to parse a packet sent by the controller, and is configured to send content of the packet obtained from parsing to the computing component, wherein the communication component is configured to use the packet format to encapsulate feedback data sent by the computing component, and is configured to send the encapsulated packet to the controller, and wherein the AI computing device includes a plurality of computing components, each computing component, of the plurality of computing components, is configured to:

receive feedback data from a first computing component via the backplane bus, the first computing component being one computing component of the plurality of computing components; and generate a second packet in the packet format using the feedback data and a first computing component identifier of the first computing component as packet data, and send the second packet to the controller via the field bus interface.

16. The control method of claim 15, wherein the obtaining of the data in the industrial automation system comprises:

determining a plurality of production parameters in first configuration information; and obtaining, from data provided by a data collection device in the industrial automation system, values of the plurality of production parameters as the data.

17. The control method of claim 16, wherein the obtaining, from data provided by a data collection device in the industrial automation system, of values of the plurality of production parameters comprises:

obtaining, from data provided by the data collection device within a previous time period, the values of the plurality of production parameters as the data at a time interval.

18. The control method of claim 15, wherein the sending, via the industrial field bus of the industrial automation system, the data to the AI computing device connected to the industrial field bus comprises:

obtaining information about a first computing component in the AI computing device from second configuration information; and sending the data to the first computing component in the first AI computing device by use of the information.

19. The control method of claim 18, wherein the obtaining of the information about a first computing component in the AI computing device from second configuration information comprises:

obtaining information about a plurality of computing components from the second configuration information;

obtaining payload information of the plurality of computing components from at least one AI computing device; and selecting a computing component from the plurality of computing components based on the payload information as the first computing component, and determining an AI computing device to which the first computing component belongs as the AI computing device.

20. The control method of claim 15, wherein the receiving, via the industrial field bus, the analysis result obtained by analyzing a production process of a production device by the AI computing device by use of the data comprises:
   obtaining output data of the AI computing device, and
   converting the output data into an analysis report, identifiable by the decision-making apparatus as the analysis result.

21. The control method of claim 18, further comprising:
   obtaining a configuration parameter of the first computing component from third configuration information, wherein the configuration parameter includes a plurality of attribute values of an AI computing architecture used by the first computing component; and
   sending the configuration parameter to the first computing component, so that the first computing component sets values of a plurality of attributes of the AI computing architecture to the plurality of attribute values.

22. The control method of claim 18, further comprising:
   obtaining training data from fourth configuration information, and
   sending the training data to the first computing component, so that the first computing component trains the AI computing architecture in the first computing component using the training data.

23. A non-transitory computer readable storage medium, storing machine readable instructions, a processor being configured to perform the control method of claim 15 when the machine readable instructions are executed by the processor.

\* \* \* \* \*